United States Patent [19]
Edwards et al.

[11] 3,915,934
[45] Oct. 28, 1975

[54] CURING OF PHENOLIC RESIN SYSTEMS WITH ZINC BORATE

[75] Inventors: Alfred Gerald Edwards, Stourport-on Severn; Glyn Islwyn Harris, Hagley, both of England

[73] Assignee: Albright & Wilson Limited, Warley, England

[22] Filed: Jan. 3, 1974

[21] Appl. No.: 430,549

[30] Foreign Application Priority Data
Jan. 16, 1973  United Kingdom............... 02273/73

[52] U.S. Cl............... 260/52; 260/19 N; 260/32 R; 260/33.2 R; 260/38.51 R
[51] Int. Cl.$^2$......................................... C08L 61/12
[58] Field of Search...................... 260/52, 59, 51 R

[56] References Cited
UNITED STATES PATENTS

| | | | |
|---|---|---|---|
| 2,606,889 | 8/1952 | Ward et al............................ | 260/59 |
| 2,785,144 | 3/1957 | Wachter.............................. | 260/293 |
| 3,083,183 | 3/1963 | Boschert et al................... | 260/57 A |
| 3,332,911 | 7/1967 | Huck................................... | 260/57 |
| 3,576,788 | 4/1971 | Harris et al.......................... | 260/52 |
| 3,755,210 | 8/1973 | Edwards........................ | 260/47 R X |
| 3,787,350 | 1/1974 | Harris et al...................... | 260/52 X |
| 3,787,350 | 1/1974 | Harris et al...................... | 260/52 X |
| 3,838,103 | 9/1974 | Edwards.............................. | 260/52 |

OTHER PUBLICATIONS
Chem. Abstracts, Vol. 79, 1973, 79743g–79745j, Obata.

*Primary Examiner*—Howard E. Schain
*Attorney, Agent, or Firm*—Flynn & Frishauf

[57] ABSTRACT

A resin composition, which can be cured to form moulded articles and laminates comprises (a) a resin having repeating units of formula

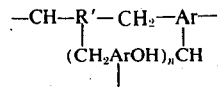

where R' is a di- or trivalent optionally substituted aromatic hydrocarbyl or di (aromatic hydrocarbyl) oxy group. Ar is the divalent residue of a phenol and $n$ is 0 or 1, (b) 5–20% by weight (based on the resin weight) of hexamine and (c) 10–100% by weight (based on the hexamine weight) of zinc borate, which acts as a cure accelerator.

12 Claims, No Drawings

CURING OF PHENOLIC RESIN SYSTEMS WITH ZINC BORATE

The present invention relates to the curing of resins containing repeating groups of the formula

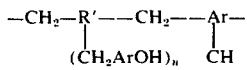

where R' is an aromatic hydrocarbon or di(aromatic hydrocarbon)oxy group, which optionally has inert substituents, and Ar is the residue of a phenolic compound as hereinafter defined and $n$ is O or 1. The production of resins of this type is described in British Pat. Specification No. 1,150,203.

These resins are cured with curing agents such as hexamethylene tetramine. We have now found that the rate of curing can be enhanced by addition of zinc borate.

The present invention provides a composition comprising (a) a resin having repeating units of the formula

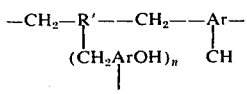

wherein R' is a divalent or trivalent aromatic hydrocarbyl or divalent or trivalent aromatic - hydrocarbyloxy-aromatic-hydrocarbyl group which optionally has inert substituents, and Ar is the residue formed by removal of 2 nuclear hydrogen atoms from a phenolic compound having 1–3 hydroxyl groups and at least 2 nuclear hydrogen atoms and $n$ is O or 1. (b) 5–20% by weight (based on the weight of resin) of hexamethylene tetramine and (c) 10 – 100% by weight (based on the weight of the hexamethylene tetramine) of zinc borate. The resin preferably consists essentially of repeating units of the above formula.

The compositions of the invention are prepared by mixing the components together in any order and then the mixture is cured by heating usually at above 70°C and preferably over 100°C e.g. 150°–175°C. Post curing if needed is usually carried out at 160°–250°C. The time needed for postcuring varies according to the properties of the desired product, and the temperature of use of that product.

The resin is preferably prepared as described in British Pat. Specification No. 1150203 by reacting (1) an aralkyl ether of the general formula R'(—CH$_2$OR)$_a$ and/or an aralkyl halide of the general formula R' — (CH$_2$X)$_a$, wherein R' is a divalent or trivalent aromatic hydrocarbyl or aromatic hydrocarbyloxy aromatic hydrocarbyl radical R' optionally containing inert substituents in the aromatic nucleus, R is an alkyl radical containing 1–5 carbon atoms, X is chlorine, bromine or iodine and $a$ has a value of 2 or 3 with (2) a molar excess normally of at least 1.3:1, preferably in the range of 1.4:1 to 2.5:1 of a phenolic compound or a phenolic compound and a non phenolic compound containing an aromatic nucleus. If $a$ is 3 then $n$ is 1 and a further ArOH group may be bonded to R' through another methylene bridge.

In these general formulae R' represent any divalent or trivalent aromatic hydrocarbyl or aromatic hydrocarbyloxy aromatic hydrocarbyl radical, for example the m - or p-phenylene radical, the diphenylene radical, the diphenylene oxide radical

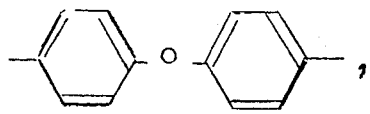

the radical

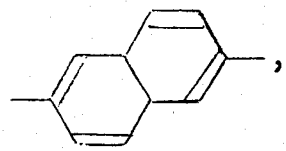

or the radical

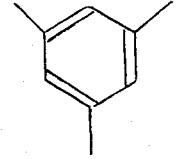

Thus both mono nuclear, and fused and unfused di- and poly nuclear radicals may be represented by R', though mononuclear radicals are preferred because the cured products therefrom have higher strength at high temperatures than those from di and polynuclear radicals. Preferably r' does not represent a diphenylene or diphenylene oxide radical when the aralkyl halide is used to prepare the resin. The resin is preferably prepared from the aralkyl ether especially ones in which R is an alkyl radical of less than 4 carbon atoms, e.g. a methyl radical. The preferred compounds for a reaction with the phenolic compounds are those in which $a$ has a value 2, particularly the p-xylylene dihalides for example p-xylylene dichloride and the p-xylylene dialkyl ethers for example p-xylylene - glycoldimethylether.

If desired the R' radical may contain substituents for example methyl radicals attached to the aromatic nucleus, provided the said substituents are inert under the conditions of the reaction. In fact the presence of chlorine or fluorine atoms in some or all of the available positions in the aromatic nucleus has been found advantageous in that it leads to improved flame resistance in the resulting polymeric products. Examples of such substituted aralkyl ethers and aralkyl halides, which may be employed according to this invention, are 2,3,5,6-tetrachloro-1,4-di(chloromethyl)benzene and 2,3,5,6-tetrachloro-1,4-di(methoxy-methyl)-benzene.

The phenolic compound includes any compound or mixture of compounds derived from benzene and containing one to three, preferably one or two, hydroxyl radicals joined to the aromatic nucleus, there being a total of not more than three substituents attached to ring carbon atoms of the benzene nucleus apart from the one essential hydroxyl group. Thus the phenolic compounds may be of formula

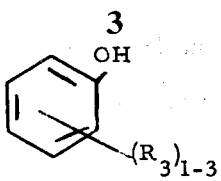

where each $R_3$ is hydrogen hydroxyl, amino, alkyl of 1 to 8 carbon atoms, e.g. methyl, ethyl, isopropyl, tert. butyl or tert. octyl, phenyl and hydroxyphenyl alkyl e.g. hydroxy phenyl-methylene, - ethylene and -isopropylidene. Examples of these phenolic compounds are phenol, p-cresol, m-cresol resorcinol, catechol, isopropyl catechol, diphenylol propane (bis 2,2-(4-hydroxy phenyl)propane, diphenylolethane, 4-methylcatechol monoalkyl phenols such as p-ethylphenol p-tert. butyl phenol and p-tert. octyl phenol, m- and p-phenyl phenol p-amino phenol, pyrogallol and phloroglucinol. Mixtures of the phenols can be used e.g. resorcinol with phenol itself, or 4-methylcatechol with catechol, as in phenolic coal tar fractions.

Examples of the non phenolic compound containing aromatic nuclei which may be mixed with the phenolic compound in the formation of the resin are diphenyl- or dibenzyl-ether terphenyl, diphenylamine, diphenyl sulphide diphenyl, anthracene diphenylsulphone, triphenyl phosphate, octaphenylcyclotetrasiloxane aryl substituted borazoles and metal complexes such as ferrocene. The proportion of aromatic compound can vary within wide limits but is not sufficient to prevent satisfactory curing of the reaction product with the hardening agent, hexamethylene tetramine. Further details of the aromatic compound and its mode of use in the reaction of phenol and dihalide or diether are given in British Pat. Specification No. 1150203.

The zinc borate is present in the compositions of the invention in an amount of 10-100% preferably 20-65% e.g. 40-50% (by weight of hexamethylene tetramine.)

The resin, zinc borate and hexamethylene tetramine can be mixed in any order but it is convenient to mix the hexamethylene tetramine and zinc borate together with any other additives (if present), and add the mixture to the resin. The mixing can be carried out in any convenient method such as dry blending to form a powder (optionally with subsequent addition of organic solvent to make a coating liquid) or blending in solutions in an organic solvent e.g. methyl isobutyl ketone or methyl ethyl ketone, methylisoamyl ketone, isophorone, diacetone alcohol, cyclohexanone, cellosolves such as 2-ethoxyethanol, cellosolve ethers e.g. the methyl ether or cellosolve esters e.g. the acetate, any of which solvents can be mixed with an aromatic hydrocarbon such as benzene, toluene or xylene or a hydrocarbon such as white spirit or solvent naphtha, or an alcohol e.g. of 1 to 6 carbon atoms, such as methanol, ethanol or n-butanol. The resin is usually present in the organic solvent solutions in an amount of 5-90% preferably 20-50% by weight. The resin solution can be used as a coating composition for use e.g. as a lamp capping cement or for production of impregnating solution for laminates. The mixing can be carried out at a low temperature e.g. 20°-30°C and the mixture stored until required, but the mixing of the hexamethylene tetramine with the remainder of the components is usually carried out at a higher temperature e.g. about 60°C for several hours e.g. 1-4 hrs. and then the mixture cooled to room temperature and stored until required.

The other ingredients which may be present in admixture with the resin, zinc borate and hexamethylene tetramine include inorganic fillers, e.g. asbestos flour, mica or chopped glass strands. The inorganic filler and resin will normally be present in a weight ratio of 0.05:1 to 4.0:1 preferably 0.3:1 to 4.0:1. The hexamethylene tetramine, is normally present in an amount of 8 to 20% by weight based on the weight of the resin, preferably 10-20%, especially 10-15%. Other ingredients such as pigments and lubricants e.g. graphite or molybdenum disulphide accelerators antistaining agents and stabilisers e.g. calcium stearate and magnesium oxide may also be present if desired as may aluminium, zinc, titanium, dioxide polytetrafluoroethylene and flame retardants, such as are described in British patent application Ser. No. 2311/73. This specification also describes the use of inorganic dispersing agents e.g. fumed silica to aid the dispersion of e.g. the zinc borate in resin solutions. The mixture of resin, zinc borate and hexamethylene tetramine, optionally with the other additives can be used to form moulding composition with fillers such as asbestos flour, or, with solvent as a coating composition or for impregnating glass fibres or asbestos fibres, present as separate fibres or as mats to form prepregs, which are formed with curing into laminates having excellent electrical properties.

The present invention is illustrated in the following Examples.

EXAMPLE 1

A moulding composition was prepared from the following ingredients:

| | |
|---|---|
| Asbestos flour | 300 pts. by weight |
| Polymer obtained from technical xylylene glycol dimethyl ether and phenol as described in Ex. 8 British patent No. 1150203 | 200 pts. by weight |
| Magnesium oxide | 6 " |
| Calcium stearate | 10 " |
| Hexamethylene tetramine | 25 " |
| Zinc borate | 10 " |

These were mixed on a 2 roll mill at 120°C for ten minutes and the resulting product had a minimum cure time of 1 min. 15 seconds. The same composition made without the zinc borate added had a minimum cure time of 2 mins. The minimum cure time was determined by making a flow cup in accordance with BS 2782(method 105b) and determining the minimum time required to produce a cup which is free of blisters on the inside of the cup base.

EXAMPLE 2

A moulding composition was made from the following ingredients:

| | |
|---|---|
| Asbestos flour | 300 parts by weight |
| Polymer obtained from phenol and technical p-xylylene glycol dimethylether according to the process of Ex. 8 of British patent no. 1150203 | 200 " |
| Magnesium oxide | 6 pts. by weight |
| Calcium stearate | 10 " |
| Hexamethylene tetramine | 25 " |
| Additive | 0-20 " (as described below) |

They were mixed on a 2 roll mill at 120°C for 10 minutes and the minimum cure time of the resulting moulding compound was measured. The nature and amount of the additive and the minimum cure time are as given below

|     | Additive | Amount (pts by wt.) | Minimum cure time |
| --- | --- | --- | --- |
|     | None | — | 2 mins 45 secs |
|     | Calcium metaborate | 10 | 2 mins 45 secs |
|     | Calcium tetraborate | " | 2 mins 45 secs |
|     | Boric acid | " | 2 mins 45 secs |
|     | Magnesium borate | " | 2 mins 45 secs |
|     | Sodium metaborate | " | 2 mins 45 secs |
|     | Sodium tetraborate | " | 2 mins 45 secs |
|     | Strontium tetraborate | " | 2 mins 45 secs |
| (a) | Zinc borate | 5 | 1 min. 30 secs |
| (b) | " | 10 | 1 min 15 secs |
| (c) | " | 15 | 1 min 30 secs |
| (d) | " | 20 | 1 min 45 secs |
|     | Zinc sulphate | 10 | 2 mins 45 secs |
|     | Zinc sulphite | 10 | 2 mins 45 secs |

(a)-(d) denote composition of this invention.

It is apparent from these results that boric acid and other metal borates apart from zinc borate do not act as accelerators of the curing, nor do zinc salts other than the borate.

We claim:

1. A composition which comprises (a) a resin having repeating units of the formula

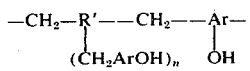

wherein R' is a divalent or trivalent aromatic hydrocarbyl group or a divalent or trivalent aromatic hydrocarbyloxyaromatic hydrocarbyl group. Ar is a residue formed by removal of 2 nuclear hydrogen atoms from a phenolic compound having 1–3 hydroxyl groups and at least 2 nuclear hydrogen atoms, and $n$ is 0 or 1 (b) 10–15% by weight (based on the weight of the resin) of hexamethylene tetramine and (c) 20–65% by weight (based on the weight of the hexamethylene tetramine) of zinc borate.

2. A composition according to claim 1 which comprises 40–50% by weight (based on the weight of hexamethylene tetramine) of zinc borate.

3. A composition according to claim 1 wherein the resin is prepared by reacting (1) an aralkyl ether of formula R'(CH$_2$OR)$_a$ or an aralkyl halide of formula R'(CH$_2$X)$_a$, where R' is as defined in claim 1, R is an alkyl group of 1 to 5 carbon atoms, X is chlorine, bromine or iodine and $a$ is 2 or 3 with (2) a molar excess of a phenolic compound as defined in claim 1 or a mixture thereof with a non phenolic compound containing an aromatic nucleus.

4. A composition according to claim 3 wherein the resin is prepared from one molar proportion of the aralkylether or halide and at least 1.4–2.5 molar proportions of the phenolic compounds.

5. A composition according to claim 4 wherein R' is mononuclear.

6. A composition according to claim 5 wherein R' is a divalent phenylene radical with at least one substituent selected from methyl groups and halogen atoms.

7. A composition according to claim 5 wherein the resin is prepared from p-xylylene glycol dimethyl ether.

8. A composition according to claim 1 which also comprises an inorganic filler.

9. A product obtained by curing a composition as claimed in claim 1.

10. A product obtained by curing a composition as claimed in claim 3.

11. A composition according to claim 5 which comprises 40–50% based on the wieght of hexamethylene tetramine of zinc borate.

12. A product obtained by curing a composition as claimed in claim 11.

* * * * *

UNITED STATES PATENT OFFICE
CERTIFICATE OF CORRECTION

Patent No. 3,915,934　　　　　　　Dated October 28, 1975

Inventor(s) ALFRED GERALD EDWARDS and GLYN ISLWYN HARRIS

It is certified that error appears in the above-identified patent and that said Letters Patent are hereby corrected as shown below:

In each of the following places, the formula as set forth in the specification should read:

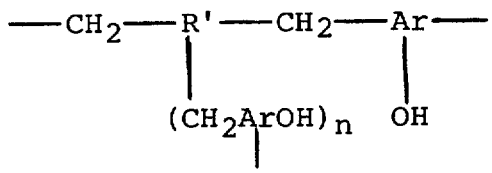

In the ABSTRACT;

Column 1, lines 8-10;

Column 1, lines 27-29;

Column 5, lines 35-38.

Claim 4, line 3, delete "at least".

Signed and Sealed this

Thirteenth Day of July 1976

[SEAL]

Attest:

RUTH C. MASON　　　　　　　　　　C. MARSHALL DANN
*Attesting Officer*　　　　　*Commissioner of Patents and Trademarks*